United States Patent [19]

Russell

[11] Patent Number: 4,646,534

[45] Date of Patent: Mar. 3, 1987

[54] MEANS FOR REFRIGERATION SPEED CONTROL

[76] Inventor: Earl Russell, 11125 Pounds Ave., Whittier, Calif. 90603

[21] Appl. No.: 755,192

[22] Filed: Jul. 15, 1985

[51] Int. Cl.⁴ ............................................... F25B 1/00
[52] U.S. Cl. ..................................... 62/228.4; 62/217
[58] Field of Search .............. 62/201, 217, 215, 228.4, 62/228.1, 228.5, 228.3, 226, 227, 203, 208, 209; 417/28

[56] References Cited

U.S. PATENT DOCUMENTS 2,983,111  5/1961  Miner et al. ..................... 62/228.4 X
4,151,725  5/1979  Kountz et al. .................. 62/228.5 X

*Primary Examiner*—Harry Tanner
*Attorney, Agent, or Firm*—Kenneth T. Theodore

[57] ABSTRACT

The invention is an indirect controller, additive to any existing refrigeration system, for extending the operating range and increasing the efficiency of the system. The invention prioritizes the methods by which said system is loaded and unloaded by giving first priority to compressor speed regulation, with wide open inlet vanes, as the primary and most energy efficient method of meeting load requirements. The second priority is enabled upon the compressor reaching its minimum speed, whereby only the inlet vanes react to further system unloading by utilization of the system's existing vane control means. This secondary priority, although less energy efficient than speed control, extends the unloading range of the existing refrigeration system beyond that which was previously available. The means is additive to any existing refrigeration system which utilizes a centrifical compressor, variable inlet vanes, inlet vane controls and driven by an electric motor. Said means utilizes a position transducer to monitor inlet vane positions, a control means comparer which receives a vane position signal from said transducer and a variable frequency driver for varying the compressor's motor speed.

6 Claims, 4 Drawing Figures

MEANS FOR REFRIGERATION SPEED CONTROL

DESCRIPTION OF THE PRIOR ART

1. Field of the Invention

This invention lies within the field of controls for large refrigeration systems, specifically controls for refrigeration systems utilizing centrifical compressors and adjustable inlet vanes.

2. Background of the Prior Art

The prior art of refrigeration controls consists of many attempts to maximize the efficiency of large refrigeration systems over their total range of operation. Typically, such attempts consist of three generic methods, i.e., varying the speed of the system's compressor, throttle the quantity of cooling media entering the compressor by the use of adjustable inlet vanes, and lastly, any combination of the previous two methods.

These attempts are necessitated because the refrigeration costs for cooling a large building typically represents over $\frac{1}{3}$ of the total energy costs associated with building maintenance. And of that cost, $\frac{1}{2}$ to $\frac{2}{3}$ of it is expended by the refrigeration's central chiller or compressor. Additionally, such refrigeration systems must by designed for maximum expected cooling loads, eventhough the majority of compressor operation is well below the maximum loads.

Prior art attempts to maximize refrigeration efficiencies has been primarily devoted to the new refrigeration systems due to the high costs and system incompatabilities associated with modifying existing systems. The prior art is void of teachings whereby modifications to existing refrigeration systems can be economically justified. Thereby, the prior art has been unable to redress the inefficiencies of the great majority of refrigeration systems in existance today.

SUMMARY AND OBJECTS OF THE INVENTION

The invention is based upon the well known fact that varying a refrigeration system's compressor speed is more energy efficient than adjusting the compressor's inlet vanes. Additionally, the overwhelming majority of existing refrigeration systems in use today are unable to vary their compressor speed but only have inlet vane control to meet varying system demands.

The invention uses all the existing controls of the existing refrigeration system and adds only three new components thereto. By this unique combination of additional components, in cooperation with the existing controls, the invention provides an indirect control means which, by sensing only the movement of said inlet vanes, is able to reduce compressor speed proportionally such that the inlet vanes are thereby opened to compensate for the now slower compressor. The invention is indirect in that it itself never responds to a direct change in temperature; it only responds to inlet vane movement caused by the direct existing controls. As will be taught below, the invention itself is insensitive to temperatures.

The invention will continue to reduce compressor speed until it senses that the inlet vanes are full open or that the compressor is at its minimun speed. During the above, the refrigeration system is operating at its maximum energy efficient range, i.e., reduced speed and wide open vanes.

At the point of minimum allowable compressor speed, the invention exercises no further control over the compressor speed and any further closure of the inlet vanes by the existing system controls produces no response from the invention. From this point on, any further system unloading will be done by the vane controls of the existing system.

The invention consists of three elements or components: a vane position transducer which senses inlet vane position and provides an electrical signal proportional to said position; a system comparer which receives the transducer signal and issues commands to a variable frequency driver which provides electrical power to the motor driving the compressor and changes the motor's speed by varying the frequency thereto in response to the signal from said comparer.

It is the primary object of this invention to provide an energy efficient, refrigeration control modification which is additive to existing refrigeration systems.

It is a further object of the invention to indirectly control any refrigeration system more efficiently by utilizing compressor speed control as the primary load control mode and adjustment of inlet vanes as the secondary control mode.

BRIEF DESCRIPTIONS OF THE DRAWINGS

DESCRIPTION OF THE PREFERRED EMBODIMENT

While the preferred embodiment is illustrated and described below, it is to be understood that variations will be apparent to those skilled in the art without departing from the principles of the invention. Accordingly, the invention is not to be limited to the specific form as described and illustrated but rather is to be limited only by a literal interpretation of the claims appended herein.

Figures 1, 2:
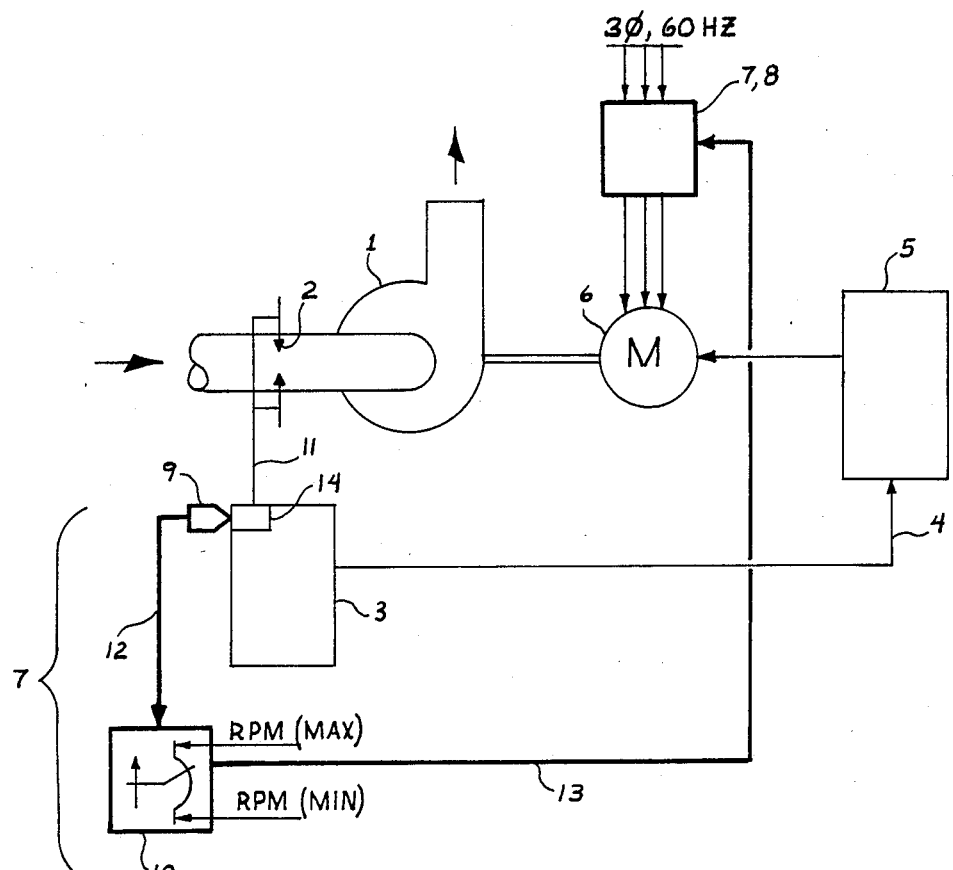
FIG. 1 is a block diagram of a typical refrigeration system and controls with the additive nature of the invention shown in heavy linework.
FIG. 2 is an electrical schematic of the connection between the transducer and the feedback potentiometer.

FIG. 1 is diagramatically illustrative of a conventional refrigeration system and includes those elements of the preferred embodiment, which are shown in heavy linework to emphase the additive feature of the invention. A centrifical compressor 1 pressurizes and discharges a refrigeration media to a condensor, which is not illustrated. Said media enters said compressor 1 at its suction/inlet side from an evaporator, also not illustrated. Located within the compressor 1 inlet are inlet guide vanes 2 which throttle the media entering said compressor 1 in response to the system's load demands. Typically, upon a reduction in load demand, the vane's 2 close proportionally, thereby reducing the system's cooling capacity. A vane position actuator 3 physically moves said vanes 2 by a vane adjustment rod 11, which traverses from said actuator 3, through the compressor inlet to said vanes 2. The signals to open or close said vanes 2 is generated by the refrigeration system controller 5 and inputted to said actuator 3 via a vane signal line 4. The parameters that said controller 5 measures and monitors are typically room temperature, outside temperature, humidity, compressor pressure, temperature of condensor and evaporator, etc., but the main parameter which is used to vary said vanes 2 is the chilled water temperature. An electric motor 6 is said compressor's 1 prime mover and typically is a three phase, 60 HZ system which receives its power directly from the building power.

The above description is representative of the typical refrigeration system's major components within the prior art. Any addition to or deletion therefrom is not to deter from the applicability of the invention to such a modified system.

The invention, a refrigeration control means 7, consists of a vane position transducer 9, a variable frequency driver 8, a control means comparer 10, and the associated electrical interconnection lines as described below and as illustrated herein.

The transducer 9, as diagramatically illustrated in FIG. 1 and FIG. 2 is shown receiving an input signal from a vane position feedback potentiometer 14, a common element of most prior art refrigeration systems which utilize a rotary type actuator 3. Said transducer 9 interconnects to said potentiometer 14 by interconnection lines 15 to the potentiometer's center tap 16 and end tap 17. The variable voltage signal from said potentiometer 14 is directly proportional to vane position and is converted by said transducer 9 to a proportional electrical signal for inputting to said comparer 10 through the vane position signal line 12.

Figure 3:
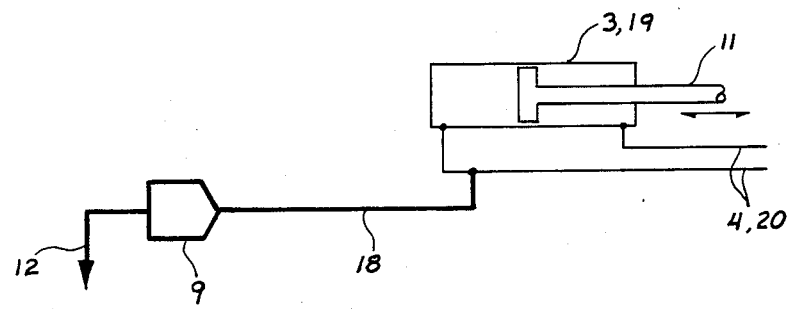
FIG. 3 is a schematic of a linear actuator connected to the transducer.

Said actuators 3 may also be of the linear type as schematically illustrated in FIG. 3. These actuators 3 are air or fluid operated, double acting pistons 19 wherein the pressure to hold a specific position is directly proportional to vane position. As known by those knowledgeable in the art, said lines 4 are control pressure lines 20 for said pistons 19. Said transducer 9 interconnects to said piston 19 by interconnecting a pressure line 18 to said line 4. Said transducer 9 converts the pressure signal therein to a proportional electrical signal for inputting to said comparer 10 through said line 12.

Figure 4:
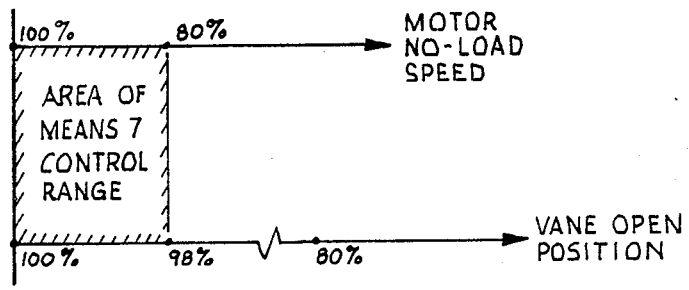
FIG. 4 is a graphical illustration of the vane position and motor speed ranges controlled or influenced by said means.

Said comparer 10 reacts to the transducer 9 signal by comparing it to its built-in logic commands, and issues compressor 1 speed changes only when said vanes 2 are within a predetermined vane 'opening range'. For teaching purposes, and for the majority of existing systems compatable with the invention, an opening range of 98% to 100% full open vanes shall be utilized herein. Typically a 99.5% open vane 2 position will result in a compressor 1 speed of 95% of its maximum speed; a 99% open vane 2 position will result in a 90% compressor 1 speed; and a 98% open vane 2 position will result in an 80% compressor 1 speed. FIG. 4 graphically illustrates the above by showing the area of refrigeration control over which the means 7 exercises its control in relationship to the two variables, i.e., speed control and vane 2 control. As taught below, the above limits/ranges are flexable to match variations in the existing refrigeration system and their controls.

Said comparer 10 electrically converts the transducer 9 signal to a proportional speed control signal for transmission over a motor speed command line 13. Set points for maximum and minimum compressor 1 speeds are adjustably fixed within said comparer 10 for each system the means 7 is added thereto. For teaching purposes only, 80% full load rated speed will be considered the minimum allowable compressor 1 speed, as shown in FIG. 4. Again for teaching purposes, the range of 80% to 100% full load rated speed will be identified as 'motor operable range'. However, there are combinations of compressors and motors which may have different values. Said comparer 10 is adjustable to all known existing values.

The variable frequency driver 8 provides the electrical power to said motor 6 and varies the frequency thereto, thereby varying motor 6 speed proportionally. The input command to vary motor 6 speed is provided by said line 13 from said comparer 10.

The functional operation of said means 7, in cooperation with the existing refrigeration system components is as described below.

Upon a load requirement decrease, said controller 5 and actuator 3 partially close said vanes 2 (unload the system) to reduce the system's cooling capacity. Said transducer 9 senses the vane 2 movement, via said potentiometer 14 or pressure change in said piston 19, and signals said comparer 10 of the new vane position. If the vane 2 position is within the 98% to 100% range, or within the said predetermined vane 'opening range', said comparer 10 then initiates a proportional signal to reduce motor speed over motor speed command line 13, to said driver 8. Said driver 8 then proportionally reduces the frequency to said motor 6, thereby reducing its speed accordingly and thus unloading the system slightly beyond that which was initially commanded by said controller 5. The system has now 'double reacted' with both vane 2 closing and motor 6 speed reduction, and is now capable of less cooling than required.

Said controller 5 now senses the 'double reaction', via the chiller water temperature and initiates a corrective command to now open said vanes 2 proportionally.

Said transducer 9 again senses the new vane 2 position and the above process is repeated untill compressor 1 speed and vane 2 position match the load requirement. Note that any time the vane 2 position is less than 98% open, the comparer 10 will not issue any speed reductions as said compressor 1/motor 6 is at the minimum allowable speed. The above process can be summerized by the following; (1) the existing system/controls reacted to load changes by closing said vanes 2; (2) the means 7 reacted by reducing compressor 1 speed; and (3) the existing system/controls opened the vanes 2. The net effect of the above is the refrigeration system now is operating at reduced compressor speed with the vanes 2 opened, the most energy efficient operation of the system.

Said means 7 has a built in gain control adjustment within said comparer 10 whereby the motor 6 speed change is slower than the vane 2 movement. This prevents the modified system from what is known in the art as "hunt and seek", i.e., the system controls are unable to find a correct setting but repeatedly go over and under said setting. Although the ranges and limits taught above are considered safe for the majority of known refrigeration systems, it is possible to adjust the comparer 10 for limits down to 60% vane 2 position and minimum compressor 1/motor 6 speeds below 80% for those systems which are capable of such values. It is to be understood that the means 7 is adjustable to any such variations in the art.

Upon reaching said minimum speed value, said refrigeration system controller 5 will continue to close said vanes 2 upon load reductions, but said means 7 will not counteract. All further load reductions will now be met by vane 2 closure only. At this point (or second priority phase), the typical refrigeration system is now capable of unloading in a range greater than its previous capability without said means 7.

The priorities described above, as established by said means 7, is also maintained whenever the load requirements upon the system are increased. When said vanes 2 are less than fully open, as when the compressor 1 is at its minimum allowable speed, a load increase will cause said controller 5 to open said vanes 2 accordingly. This is accomplished without any restriction or action by said means 7. Only after said transducer 9 indicates open (98%) vanes 2 will said comparer 10 issue an increase speed command to meet the increased load requirement.

Having just described my invention, what I claim is:

1. An energy efficient refrigeration control means additive to existing refrigeration systems that utilize a centrifical compressor and electrical motor to drive same, adjustable inlet vanes, a system controller and a vane position actuator, wherein said control means comprises,
   a vane position transducer which upon sensing movement of said vanes, produces an electrical signal proportional to the changed vane position,
   a variable frequency driver which varies the electrical frequency to said motor to proportionally vary the speed of said motor, and
   a control means comparer which receives said transducer signal, compares the changed vane position to a predetermined vane opening range and said motor speed to a predetermined operable range, and issues a proportional command to said driver to vary motor speed upon said ranges being satisfied,
   whereby a closing of said vanes will cause a proportional decrease in motor speed to reduce refrigeration cooling capacity below that required,
   thereby forcing said system controller to subsequently opening said vanes and increase cooling capacity to meet system load requirements such that said refrigeration system operates at full open vanes at reduced motor speed.

2. The control means of claim 1 wherein the closing of said vanes by said system controller and actuator will cause said transducer to indicate the vane's changed position to said comparer and cause said comparer to command said driver to proportionally reduce compressor speed,
   thereby causing said controller to reactively open said vanes as compensation for a reduction in load capability caused by said speed reduction,
   such that said comparer will continue to affect motor speed reduction untill said transducer indicates said vanes no longer change position, such that said system is now capable of meeting the reduced load requirement.

3. The control means of claim 2 wherein said comparer has a compressor's minimum speed pre-set therein, and
   said comparer will issue no speed reduction command below the pre-set minimum speed,
   thereby enabling said controller to close said vanes unimpeded by said means and extending the cooling range of said refrigeration system.

4. The control means of claim 1 wherein the opening of said vanes to its full open position by said system controller and actuator will cause said transducer to to indicate the vane's changed position to said comparer and cause said comparer to command said driver to proportionally increase compressor speed,
   thereby causing said controller to reactively close said vanes as compensation for an increase in load capability caused by said speed increase,
   such that said comparer will continue to affect motor speed increases until said transducer indicates said vanes no longer change position, such that said system is now capable of meeting the increased load requirement.

5. The control means of claim 4 wherein said comparer has a compressor's maximum speed pre-set therein, and
   said comparer will issue no speed increase command above the pre-set maximum value.

6. The control means of claim 1 wherein an increase in cooling requirements, indicated by the opening of said vanes and sensed by said transducer, causes said comparer to command an increase in motor speed only when the vane position is within said predetermined vane opening range.

* * * * *